Patented June 3, 1930

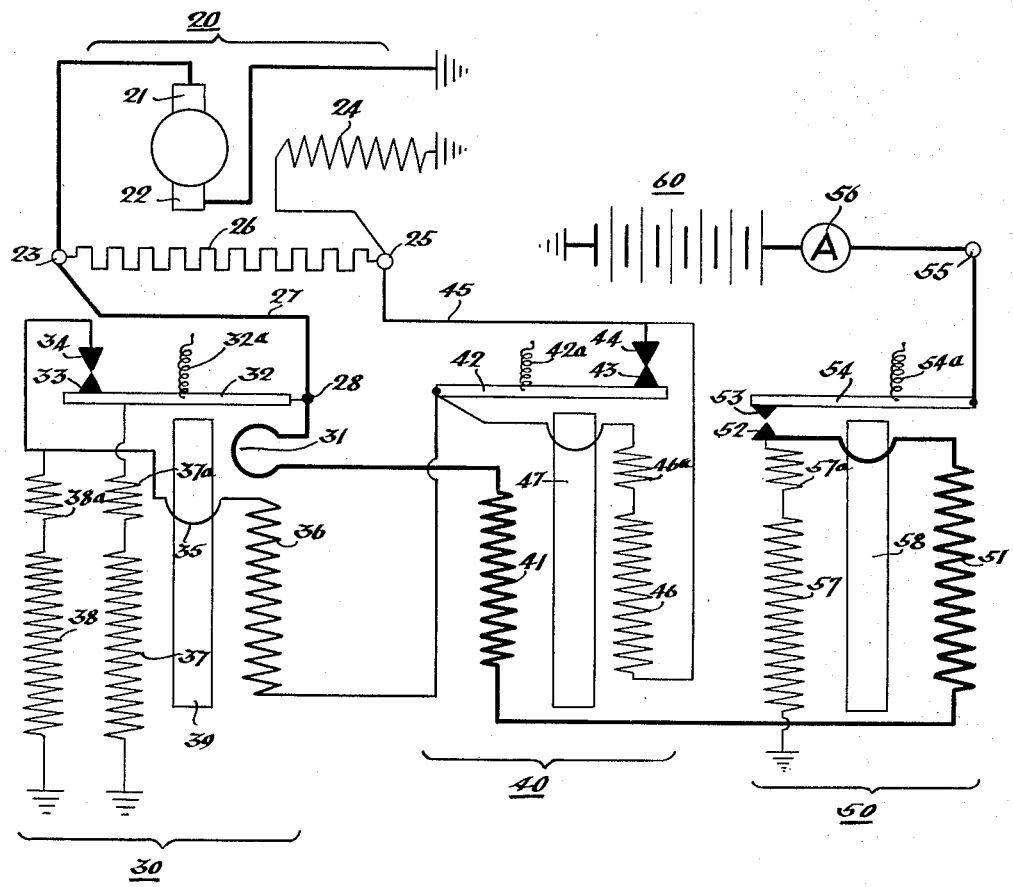

1,761,524

UNITED STATES PATENT OFFICE

JOHN T. FITZSIMMONS AND JOE WHITE, OF ANDERSON, INDIANA, ASSIGNORS TO DELCO-REMY CORPORATION, OF DAYTON, OHIO, A CORPORATION OF DELAWARE

GENERATOR REGULATING SYSTEM

Application filed November 21, 1927. Serial No. 234,609.

This invention relates to a system of regulation for an electric generator and more particularly a variable generator for charging a storage battery.

One of the objects of the present invention is to provide improvements in the type of regulating apparatus employing electromagnetic means responsive to the voltage or current of the generator, or both, for controlling the operation of a vibratory member or armature which vibrates for the purpose of intermittently interrupting a short circuit around a resistance element for maintaining the field current of the generator within certain limits. More particularly, the present invention aims to reduce arcing at the contacts of the resistance short circuit interrupter. Other objects are to maintain the voltage of the generator within certain limits regardless of variations in temperature of the regulator and variations in the speed of the generator.

A further object is to maintain the output of the generator within certain limits regardless of the state of charge of the storage battery which is being charged by the generator.

Further objects and advantages of the present invention will be apparent from the following description, reference being had to the accompanying drawings, wherein a preferred form of embodiment of the present invention is clearly shown.

In the drawings:

The figure is a wiring diagram illustrating the present invention.

The principal elements of the system embodying the present invention are: a generator 20, a voltage regulator 30, a current regulator 40, a reverse-current relay 50 and a storage battery 60. Generator 20 comprises main brushes 21 and 22, the latter being grounded and the former connected with a terminal 23. The generator field circuit 24 is grounded at one end and connected at the other end with a terminal 25. A non-inductive resistance element 26 is connected across the terminals 23 and 25 and operates in a manner to be described to reduce the current in the field winding 24.

The battery-charging or work circuit continues from the terminal 23 and includes wire 27, connected with a terminal 28 of the regulator 30, a magnet coil 31 of the regulator 30, a magnet coil 41 of the regulator 40, a magnet coil 51 of the relay 50, relay interrupter contacts 52 and 53, relay armature 54, relay terminal 55, an ammeter 56, and battery 60.

The non-inductive resistance 26 is normally short circuited by the following circuit: wire 27, terminal 28, the armature 32 of the regulator 30, interrupter contacts 33 and 34 which are normally closed, wire 35, magnet coil 36, the armature 42 of the regulator 40, regulator interrupter contacts 43 and 44, and the wire 45 leading to terminal 25.

The main exciting or magnetizing winding of the regulator 30 comprises the coil 37 and a coil 37$^a$ of relatively few turns of wire of relatively high resistance and having low or negligible temperature coefficient of resistance. The main magnetizing coil is connected between the armature 32 and ground.

The demagnetizing winding of the regulator is provided by the coils 38 and 38$^a$ which are connected in series between the wire 35 and ground. The winding 38$^a$ is made of wire of relatively high resistance and of relatively low or negligible temperature coefficient of resistance. The windings 31, 36, 37, 37$^a$, 38 and 38$^a$ are wound upon a core 39 which is in a magnetic circuit including the armature 32. For sake of clearness the diagram shows these windings separated from the core 39.

In order to more clearly understand the functions of the various windings of the voltage regulator 30, one example is given of the electrical dimensions of the coils which have been found satisfactory for a fifteen volt generator for charging a twelve volt storage battery at about 40 amps. or for supplying an output of about 600 watts:

Resistance unit 26, #34 IA wire, resistance 160 ohms; main coil 37, 1,830 turns #27 EC wire; main coil 37$^a$, 70 turns #29 IA wire; total resistance 65 ohms.

Demagnetizing coil 38, 1,050 turns #31 EC wire; demagnetizing coil 38$^a$, 55 turns #32 IA wire; total resistance 130 ohms.

Compensating coil 36, 62 turns #18 EC wire. (EC=enameled copper; IA=negligible temperature coefficient.)

The coil 36 will be known hereafter as the compensating coil since it tends to compensate for certain variations in the function of the demagnetizing coils 38 and 38ª.

It is well understood by those skilled in this art that a regulator having a vibratory armature tends to control the generator by rapidly opening and then closing a short circuit around a resistance in series with the generator field circuit. Briefly, when the voltage of the generator is below a certain value, contacts 33 and 34 will remain closed so that the resistance coil 26 will be short circuited. When the voltage exceeds a certain value, the magnetizing effect produced by the coils 37, 37ª, 38 and 38ª, which act cumulatively before the contacts open, will be sufficient to attract the armature 32 toward the core 39 against the action of a spring 32ª. After the contacts 33 and 34 separate, the current in the field winding 24 will be reduced resulting in a reduction of flux across the armature and a reduction in voltage across the terminals of the generator. When the voltage falls below a certain value, the magnetizing effect of the coils 37 and 37ª will be reduced sufficiently to permit the spring 32ª to retract the armature 32 from the core 39 and to cause the contact 33 to engage the contact 34. When this occurs, the resistance 26 will be short circuited and the field current will increase. This cycle of operations will be repeated in rapidly recurring sequence in order to prevent increase in the voltage of the generator beyond a certain limit.

As stated before, the coils 38, 38ª act cumulatively with the coils 37 and 37ª while the contacts 33 and 34 are closed. At the instant these contacts open due to the phenomenon of self induction in the field coil 24, there is a surge of current through the coils 38, 38ª in such direction as to cause the magnetism produced at that instant by the coils 38, 38ª to oppose the magnetism then produced by the coils 37 and 37ª. In this way the inductive kick of the field coil 24 is utilized in de-magnetizing the regulator 30 so that the closing of the contacts 33 and 34 will follow almost instantaneously upon the reduction of field current, field flux and generator voltage. Hence the action of armature 32 will be relatively rapid, and the generator may be controlled with the minimum of resistance in the resistance coil 26. Consequently, arcing at the contacts 33, 34 will be materially reduced.

It should be borne in mind also that the demagnetizing coils 38, 38ª will assist the main coil 37, 37ª in opening the vibrator contacts. Since this is true, the assistance given by these coils 38, 38ª will vary according to the speed of the generator. When the generator speed is higher the current in the field 24 will have a lower average value than when the generator speed is lower. Therefore the average value of current flowing through the coils 38, 38ª before the contacts open, will be lower at higher engine speeds; and the coils 38, 38ª will have less power to attract the armature before the contacts are separated. Therefore, at higher speeds the voltage of the generator must increase to a higher value so that the deficiency in attracting power of the coils 38, 38ª is made up by increasing the attracting power of the windings 37, 37ª. The result is that the regulator will tend to regulate at a higher voltage at higher engine speeds than at lower speeds. In order to compensate for this variation in the function of the coils 38, 38ª to assist the coils 37, 37ª, more turns are added to the coils 38, 38ª and these coils are bucked by the compensating coil 36 which when energized produces a flux in opposition to the flux produced by the coils 37, 37ª and coils 38, 38ª. Therefore, as the generator speed increases and the field current tends to decrease, there will be a corresponding decrease in the bucking effect of the coil 36, since the coil 36 is directly in series with the field coil 24. Since the bucking effect decreases as the speed increases, there will be a compensation for the fact that the assisting effect of the coils 38, 38ª will decrease as the speed increases. Therefore, the algebraic sum of the fluxes produced by the different coils will tend to remain constant over a relatively wide variation at generator speed. It is certainly apparent that the generator voltage will be regulated at a lower value with the compensating coil 36 than without it.

The coil 31 is preferably ¾ of a turn of #7, rectangular enameled copper wire and is used for preventing an abnormal increase in the wattage of the generator before the current regulator 40 has had opportunity to operate. It is intended that the function of this winding is to limit the output of the generator so that a nearly discharged storage battery will not be charged at too great a rate.

The current regulator 40 comprises in addition to the main exciting coil 41, a demagnetizing winding comprising coils 46 and 46ª. Windings 41, 46 and 46ª all surround a core 47 which is included in the magnetic circuit of the armature 42. The following electrical dimensions are given by way of example, when the current regulator is used with the voltage regulator previously described:

Main coil 41, 12 turns #7 EC rectangular wire; demagnetizing coil 46, 425 turns #31 EC wire; demagnetizing coil 46ª, 75 turns #34 IA wire; total resistance of coils 46 and 46ª about 85 ohms.

The current regulator will begin to function after a predetermined amount of current is being taken from the generator and the operation is similar to that of the voltage regulator in that the armature 42 is vibrated in order to intermittently interrupt the short circuit of the resistance wire 26 by intermittently separating the contacts 43 and 44. After the contacts separate the field current will be reduced, consequently the field flux and the generator voltage, and the current output flowing through the coil 41 are reduced. When there has been a sufficient reduction of current in the coil 41, a spring 42a connecting the armature 42 with a stationary part will overcome the magnetism of the regulator and will close the contacts 43 and 44. This cycle of operation will continue at a rapid rate so long as there is a tendency for the current to exceed a certain value.

At the instant of separation of contacts 43 and 44, current will flow in a substantial quantity through the coils 46, 46a. These coils are wound so as to have a demagnetizing effect in order to hasten the closing of the contacts 43 and 44. Consequently, the closing of the contacts will follow almost instantly upon the event of reduction of current in the field circuit and consequent reduction of current in the battery charging circuit.

In both the voltage regulator 30 and the current regulator 40 the various demagnetizing coils tend to accelerate the speed of operation of the regulators and therefore permit of regulation for voltage or current while reducing to the minimum the amount of current necessary to be carried by the contacts 33, 34, 43 and 44 at the time of their separation. Therefore there will be less arcing at the contacts and the life of the contacts will be longer.

The reverse current or cutout relay 50 includes in addition to the coil 51 hereafter called the holding coil, a main energizing winding comprising coils 57 and 57a which together with the coil 51 surround a core 58 included in the magnetic circuit of the armature 54 which is normally held by spring 54a in such position that the contact 53 is separated from the contact 52. When a predetermined generator voltage has been obtained, the coils 57 and 57a will be energized sufficiently to attract the armature 54 and to close the contacts 52 and 53 thereby establishing the battery charging circuit including the coil 51 which operates then as a holding coil for holding the contacts 52 and 53 in engagement although the voltage impressed upon the coils 57 and 57a may vary over a relatively wide range of limit. When the generator voltage falls below a certain value so that current will flow from the battery into the generator, the magnetism produced by the coil 51 will be reversed and will oppose the magnetism produced by the coils 57 and 57a thereby permitting the spring 54a to retract the armature 54 from the core 58 in order to separate the contact 53 from the contact 52 so that further discharge of the battery will be prevented.

Where the reverse current relay is used in a system with the voltage and current regulating devices which have been described, the following electrical dimensions have been found satisfactory:

Main magnetizing coil 57, 2000 turns #31 EC wire; main magnetizing coil 57a, 53 turns #32 IA wire, total resistance about 90 ohms.

Winding 51, 19¾, #7 EC rectangular wire. (The cross sectional dimensions of #7 wire are about .115 inch by .140 inch.)

The magnetizing coils in the regulating system which have regular relatively high resistance are each composed of two coils, one for a relatively low resistance for producing most of the ampere turns and the other of relatively high resistance and having a relatively low temperature coefficient of resistance. In this way, the current flowing through these windings will vary but slightly over a relatively wide range of temperature change.

While the form of embodiment of the present invention as herein disclosed, constitutes a preferred form, it is to be understood that other forms might be adopted, all coming within the scope of the claims which follow.

What is claimed is as follows:

1. A system of generator regulation comprising, in combination, a generator having a field circuit, a regulating resistance in the field circuit, a normally completed short circuit around the regulating resistance and including a set of interrupter contacts, one operated by a movable armature, a magnetizing winding responsive to generator voltage for attracting the armature to separate the contacts, the winding responsive to self-induction in the field circuit when the contacts are separated for producing a demagnetizing effect upon the first mentioned winding, and a winding for compensating for variations in the function of the system due to variations in speed of the generator.

2. A system of generator regulation comprising, in combination, a generator having a field circuit, a regulating resistance in the field circuit, a normally completed short circuit around the regulating resistance and including a set of interrupter contacts, one operated by a movable armature, a magnetizing winding responsive to generator voltage for attracting the armature to separate the contacts, a winding operating before the contacts are opened to assist the first mentioned winding in attracting the armature and responsive to self-induction in the field circuit when the contacts are separated for producing a demagnetizing effect upon the first mentioned winding, and a winding for compensating for variations in the function of the second mentioned winding due to variations in the speed of the generator.

3. A system of generator regulation comprising, in combination, a generator having a field circuit, a regulating resistance in the field circuit, a normally completed short circuit around the regulating resistance and including a set of interrupter contacts, one operated by a movable armature, a magnetizing winding responsive to generator voltage for attracting the armature to separate the contacts, a winding operating before the contacts separate cumulatively with the first winding to attract the armature and responsive to the separation of the contacts to buck the first winding, and a winding operating to buck the first and second mentioned windings while the contacts are closed and responsive to variations in field current in order to compensate for variations in the function of the second mentioned winding due to variations in generator speed.

4. A system of generator regulation comprising, in combination, a generator having a field circuit and a field regulating resistance connected in series across the generator line, a normally closed short circuit connected to the ends of the regulating resistance and including a pair of interrupter contacts in series with an electromagnet coil, one of the contacts being operated by an armature, a main magnet winding connected across the generator line for attracting the armature, and a magnet winding connected, while the contacts are closed, in parallel with and cumulatively with the main magnet winding, but connected, when the contacts are opened, in such manner as to demagnetize the main magnet winding due to the inductive kick of the field winding, said first mentioned magnet coil in series with the field winding having a bucking effect upon the other magnet windings while the contacts are closed, the degree of the bucking effect depending on the field current in order to compensate for variations in the assisting effect produced by the last named magnet winding due to variations in generator speed.

5. A system of generator regulation comprising, in combination, a generator having a field circuit and a field regulating resistance connected in series across the generator line, a normally closed short circuit connected to the ends of the regulating resistance and including a pair of interrupter contacts in series with an electromagnet coil, one of the contacts being operated by an armature, a main magnet winding connected across the generator line for attracting the armature, and a magnet winding connected between one side of the generator line and a point between the interrupter contacts and the first named magnet coil, and so as to act cumulatively with the main magnet coil before the contacts separate but differentially when the contacts open due to the inductive kick in the field coil, said first mentioned magnet coil in series with the field winding having a bucking effect upon the other magnet windings while the contacts are closed, the degree of the bucking effect depending on the field current in order to compensate for variations in the assisting effect produced by the last named magnet winding due to variations in generator speed.

6. A system of generator regulation comprising, in combination, a work circuit, a generator having a field circuit, a regulating resistance in the field circuit, a normally completed short circuit around the regulating resistance and including two sets of interrupter contacts in series with a magnet coil connected between them, means responsive to generator voltage for intermittently separating one set of contacts, means responsive to current flowing in the work circuit for intermittently separating the other set of contacts, and means including said magnet coil for compensating for variations in the regulating effect of the first named means due to variations in generator speed.

7. A system of generator regulation comprising, in combination, a work circuit, a generator having a field circuit, a regulating resistance in the field circuit, a normally completed short circuit around the regulating resistance and including two sets of interrupter contacts in series with a magnet coil connected between them, means responsive to current flowing in the work circuit for intermittently separating one set of contacts, means responsive to generator voltage for intermittently separating the other set of contacts, said last named means comprising a main magnetizing winding connected across the generator line and a winding which operates cumulatively relative to the main winding before the contacts separate and differentially after the contacts separate, and means including the magnet coil in the resistance short circuit for compensating for variations in the function of the last named winding due to variations in generator speed.

8. A system of generator regulation, comprising in combination, a work circuit, a generator having a field circuit, a regulating resistance in the field circuit, a normally completed short circuit around the regulated resistance and including two sets of interrupted contacts in series, means responsive to generator voltage for intermittently separating one set of contacts, said means including a relay having its coil in parallel with said resistance, and means responsive to current flowing in the work circuit for intermittently separating the other set of said contacts.

In testimony whereof we hereto affix our signatures.

JOHN T. FITZSIMMONS.
JOE WHITE.